US012650707B2

United States Patent
(12) United States Patent
Sabut et al.

(10) Patent No.: US 12,650,707 B2
(45) Date of Patent: Jun. 9, 2026

(54) FLICKER NOISE FREE BANDGAP REFERENCE VOLTAGE GENERATOR CIRCUIT

(71) Applicant: STMicroelectronics International N.V., Geneva (CH)

(72) Inventors: Marc Sabut, Eybens (FR); Emmanuel Allier, Grenoble (FR); Matthieu Desvergne, Claix (FR); Denis Cottin, Crolles (FR)

(73) Assignee: STMicroelectronics International N.V., Geneva (CH)

( * ) Notice: Subject to any disclaimer, the term of this patent is extended or adjusted under 35 U.S.C. 154(b) by 222 days.

(21) Appl. No.: 18/373,520

(22) Filed: Sep. 27, 2023

(65) Prior Publication Data

US 2025/0103072 A1 Mar. 27, 2025

(51) Int. Cl.
*G05F 3/30* (2006.01)

(52) U.S. Cl.
CPC .................................... *G05F 3/30* (2013.01)

(58) Field of Classification Search
CPC .................................................. G05F 3/20–30
See application file for complete search history.

(56) References Cited

U.S. PATENT DOCUMENTS 6,285,244 B1 * 9/2001 Goldberg ................. G05F 3/30 327/542
10,983,547 B1 4/2021 Ivanov
2002/0158682 A1 10/2002 Conte et al.
2005/0231270 A1 * 10/2005 Washburn ................. G05F 3/30 327/539
2008/0224759 A1 9/2008 Marinca
2010/0295529 A1 11/2010 Consoer
2014/0254202 A1 * 9/2014 Balakrishnan ......... H03K 5/084 363/16
2016/0266598 A1 * 9/2016 Wong ...................... G05F 3/267
2022/0050488 A1 * 2/2022 Randlisek ................. G05F 3/30
2022/0109413 A1 4/2022 Danyuk et al.
2022/0374037 A1 11/2022 Motz et al.
2024/0168507 A1 5/2024 Krishnan et al.

OTHER PUBLICATIONS

Paul Brown and Wallace Tennille. "Comparison of Operational Transconductance Amplifiers." Georgia Tech, May 16, 2011, Internet Archive Wayback Machine, https://web.archive.org/web/20110516223604/http://users.ece.gatech.edu/~lanterma/studentprojects/TeamOTAComparison.pdf. Accessed Sep. 17, 2025. (Year: 2011).*
Nagulapalli R., et al.: "A Single BJT 10.2 ppm/° C. Bandgap Reference in 45nm CMOS Technology," Oxford Brookes University, UK, 27-Oct. 2020, 4 pgs.

* cited by examiner

*Primary Examiner* — Crystal L Hammond
*Assistant Examiner* — Jennifer C Caulk
(74) *Attorney, Agent, or Firm* — Crowe & Dunlevy LLC

(57) ABSTRACT

A bandgap voltage generator circuit is formed using only bipolar transistors. The bandgap voltage generator circuit includes an output node at which a bandgap reference voltage is generated. A transconductance amplifier circuit in a current control feedback loop has a differential input which receives a base current. A compensation current sink circuit operates to sink a compensation current from the output node corresponding to the base current received at the differential input of the transconductance amplifier.

20 Claims, 2 Drawing Sheets

FLICKER NOISE FREE BANDGAP REFERENCE VOLTAGE GENERATOR CIRCUIT

TECHNICAL FIELD

The present disclosure generally relates to reference voltage generator circuits of the bandgap type and, in particular, a bandgap reference voltage generator circuit formed using only bipolar transistors to address flicker noise concerns and including a compensation circuit configured to compensate for bipolar base current effects.

BACKGROUND

Reference is made to FIGS. 1A and 1B which show a circuit diagram for a conventional current-mode bandgap reference voltage generator circuit 10. The circuit 10 includes a current mirroring circuit 12 and bandgap core circuit 14.

The current mirroring circuit 12 is formed by p-channel metal oxide semiconductor field effect transistor (MOSFET) devices M1, M2 and M3. The source terminals of transistors M1, M2 and M3 are coupled, preferably connected, to the supply node Vdd. The gate terminals of transistors M1, M2 and M3 are coupled, preferably connected, to each other and biased by a voltage Vout to generate mirrored currents. The drain terminal of transistor M1 outputs a first mirrored current, the drain terminal of transistor M2 outputs a second mirrored current, and the drain terminal of transistor M3 outputs a third mirrored current. The third mirrored current output from the drain terminal of transistor M3 is applied across resistor R3 to generate the bandgap reference voltage Vbg at an output node of the circuit 10. Resistor R3 has a first terminal coupled, preferably connected, to the drain of transistor M3 at the output node and a second terminal coupled, preferably connected, to the ground node Gnd.

The bandgap core circuit 14 includes a differential amplifier circuit 16, for example comprising an operational amplifier (OP-AMP), configured in a current control feedback loop that generates the bias voltage Vout which controls generation of the mirrored currents by the transistors M1, M2 and M3. The non-inverting (+) input of the differential amplifier circuit 16 receives a voltage V+ at the drain of the transistor M1 and the inverting (−) input of the differential amplifier circuit 16 receives a voltage V− at the drain of the transistor M2. The bandgap core circuit 14 further includes PNP bipolar transistors Q1 and Q2. The collector terminals of transistors Q1 and Q2 are coupled, preferably connected, to the ground node Gnd. The base terminals of transistors Q1 and Q2 are coupled, preferably connected, to each other and to the ground node Gnd. The transistors Q1 and Q2 of the bandgap core circuit 14 are thus each connected in diode-configuration. The emitter terminal of transistor Q1 is coupled, preferably connected, to an intermediate node 18. The emitter terminal of transistor Q2 is coupled, preferably connected, to the drain of transistor M2 at the inverting (−) input of the differential amplifier circuit 16. A resistor R1 has a first terminal coupled, preferably connected, to the intermediate node 18 and a second terminal coupled, preferably connected, to the drain of transistor M1 at the non-inverting (+) input of the differential amplifier circuit 16. A first resistor R2 has a first terminal coupled, preferably connected, to the drain of transistor M1 at the non-inverting (+) input of the differential amplifier circuit 16 and a second terminal coupled, preferably connected, to the ground node Gnd. A second resistor R2 has a first terminal coupled, preferably connected, to the emitter of transistor Q2 at the inverting (−) input of the differential amplifier circuit 16 and a second terminal coupled, preferably connected, to the ground node Gnd.

As an example, the differential amplifier circuit 16 includes a differential pair 20 of input transistors M5, M6 coupled to a current mirror load circuit 22 formed by transistors M7, M8. The input transistors M5, M6 are n-channel MOSFETs. The load transistors M7, M8 are p-channel MOSFETs. The common source terminals of the transistors M5 and M6 are coupled, preferably connected, to a tail current source 20 connected to the ground node Gnd. The gate terminal of input transistor M5 (at the non-inverting (+) input) receives the voltage V+ at drain of the transistor M1 and the gate terminal of the input transistor M6 (at the inverting (−) input) receives the voltage V− at drain of the transistor M2. The drain terminal of input transistor M5 is coupled, preferably connected to the drain and gate terminals of the load transistor M7. The drain terminal of input transistor M6 is coupled, preferably connected to the drain terminal of the load transistor M8 at the output of the amplifier. The gate terminals of the transistors M7, M8 are coupled, preferably connected, to each other. The transistor M7 is connected in diode-configuration. The output voltage Vout of the differential amplifier circuit 16 is generated at the common drain terminals of transistors M6, M8 and is a function of the difference between the voltages V+ and V−, and the magnitudes of the first, second and third mirrored currents at the drains of transistors M1, M2 and M3 is a function of the voltage Vout.

The principle of operation of the circuit 10 is to generate a complementary to absolute temperature (CTAT) voltage and a proportional to absolute temperature (PTAT) voltage, and then add those voltage in a scaled proportion to achieve a cancelation of the positive and negative temperature coefficients.

The generating of the PTAT component uses the difference in base to emitter voltages ($V_{BE}$) between two forward bias voltages having different current densities (m) using transistors Q1 and Q2. The voltage across resistor R1 is then PTAT in nature:

$$I_{ptat} = \frac{V_T \ ln \ m}{R1}$$

The current flowing through the resistor R2 is CTAT:

$$I_{ctat} = \frac{V_{BE}}{R2}$$

The output bandgap voltage Vbg can be expressed as follows:

$$Vbg = \frac{R3}{R2}\left(V_{BE} + \frac{R2}{R1} V_T \ ln \ m\right)$$

The operating point of the circuit 10 can accordingly be scaled by setting of the resistances for resistors R2 and R3, and the temperature coefficient can be adjusted by setting of the resistances for resistors R1 and R2.

There is a recognized problem with the circuit 10. The MOSFETs M5, M6, M7 and M8 introduce flicker (1/f) noise which can perturb the output voltage Vbg. This is a concern when the output voltage Vbg provides a reference voltage for a noise sensitive circuit (like an analog-to-digital converter (ADC)).

To address the issue of flicker noise, there is a teaching in the art to use a chopper technique. See, for example, U.S. Patent Application Publication No. 2010/0295529 and U.S. Pat. No. 10,983,547 (both incorporated herein by reference). However, there are a number of drawbacks associated with the use of the chopper technique including the need for more complicated circuitry and a stable (for example, external) clock source to control the switching operations.

SUMMARY

In an embodiment, a circuit comprises: a bandgap voltage generator circuit formed using only bipolar transistors, wherein the bandgap voltage generator circuit includes an output node at which a bandgap reference voltage is generated and a transconductance amplifier circuit in a current control feedback loop having a differential input which receives a base current; and a compensation current sink circuit configured to sink a compensation current from the output node corresponding to the base current at the differential input of the transconductance amplifier.

In an embodiment, a circuit comprising: a current mirroring circuit including a first bipolar transistor, a second bipolar transistor and a third bipolar transistor, wherein an output voltage is generated at an output node in response to a third mirrored current output by the third bipolar transistor; a bandgap core circuit including: a fourth bipolar transistor and fifth bipolar transistor coupled, respectively, to the first and second bipolar transistors and configured to use a difference in base to emitter voltages of the fourth and fifth bipolar transistors to generate a complementary to absolute temperature (CTAT) voltage and a proportional to absolute temperature (PTAT) voltage from first and second mirrored currents output by the first and second bipolar transistors, respectively; and a transconductance amplification circuit having a differential input coupled, respectively, to the first and second bipolar transistors to receive a base current, and an output coupled to apply a bias current to base terminals of the first, second and third bipolar transistors; and a current sink circuit configured to sink a compensation current from the output node corresponding to the base current at the differential input of the transconductance amplification circuit.

BRIEF DESCRIPTION OF THE DRAWINGS

For a better understanding of the embodiments, reference will now be made by way of example only to the accompanying figures in which.

DETAILED DESCRIPTION

Like features have been designated by like references in the various figures. In particular, the structural and/or functional features that are common among the various embodiments may have the same references and may dispose identical structural, dimensional and material properties.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms "front", "rear", "top", "bottom", "left", "right", etc., or relative positions, such as terms "above", "under", "upper", "lower", etc., or to terms qualifying directions, such as terms "horizontal", "vertical", etc., unless specified otherwise, it is referred to the orientation of the drawings.

Figure 2A:
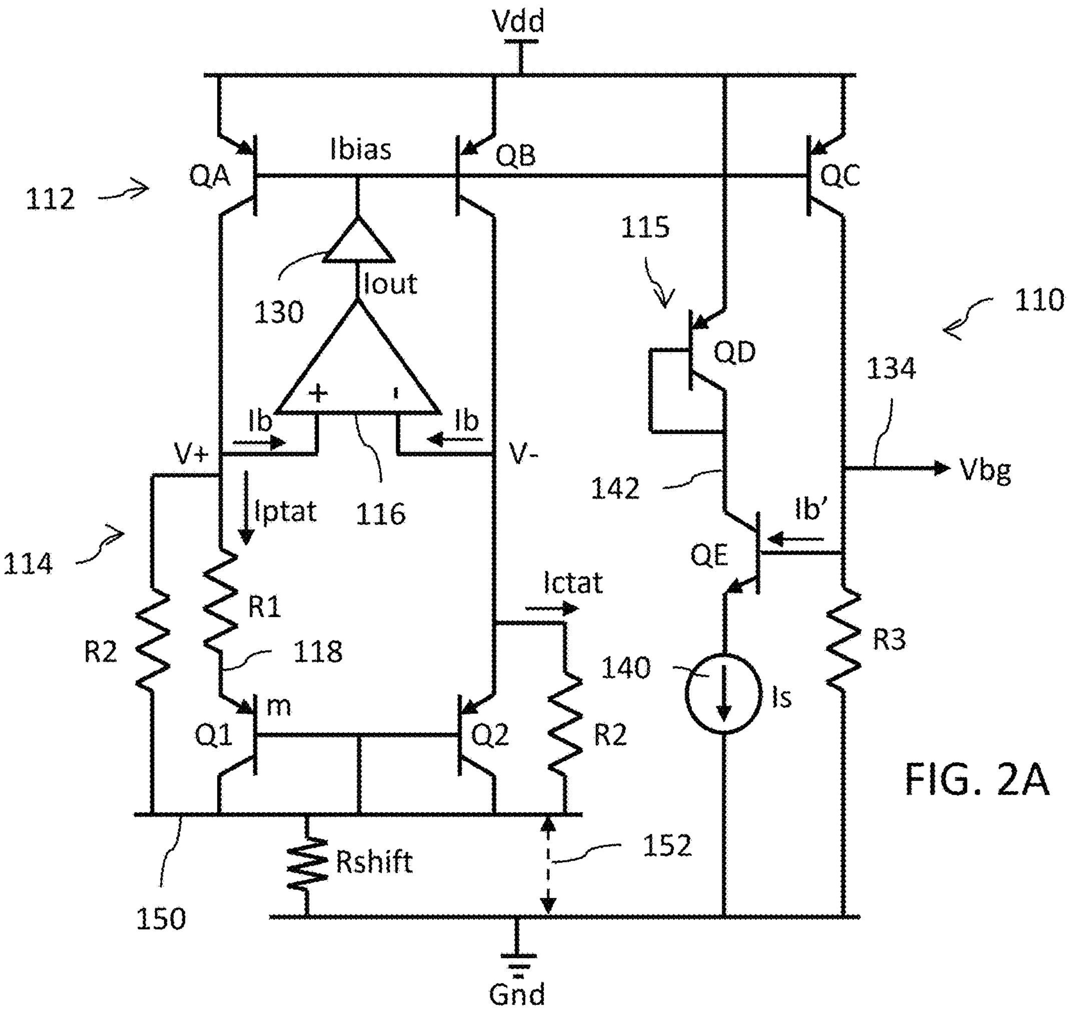
FIGS. 2A and 2B show a circuit diagram for a flicker noise free current-mode bandgap reference voltage generator circuit.
Figure 2B:
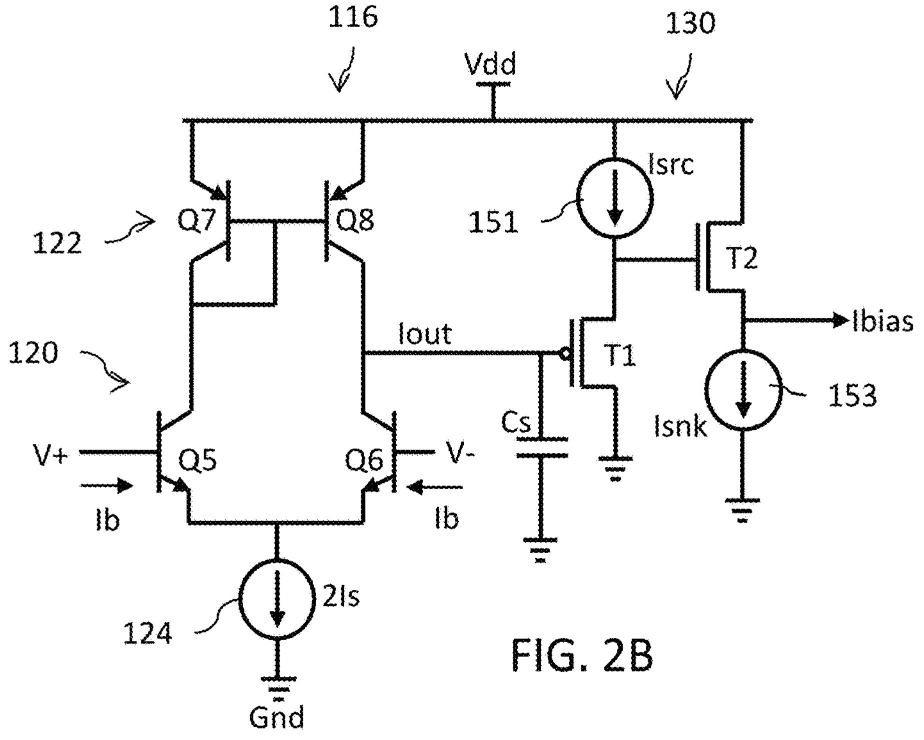

Reference is now made to FIGS. 2A and 2B which show a circuit diagram for a flicker noise free current-mode bandgap reference voltage generator circuit 110. The circuit 110 includes a currenting mirror circuit 112, a bandgap core circuit 114 and a compensation current sink circuit 115.

The current mirroring circuit 112 is formed by PNP bipolar transistors QA, QB and QC. The emitter terminals of transistors QA, QB and QC are coupled, preferably connected, to the supply node Vdd. The base terminals of transistors QA, QB and QC are coupled, preferably connected, to each other and biased by a bias current Ibias to generate mirrored currents. The collector terminal of transistor QA outputs a first mirrored current, the collector terminal of transistor QB outputs a second mirrored current, and the collector terminal of transistor QC outputs a third mirrored current. The third mirrored current output from the collector terminal of transistor QC is applied across resistor R3 to generate the bandgap reference voltage Vbg at an output node 134 of the circuit 110. Resistor R3 has a first terminal coupled, preferably connected, to the collector of transistor QC at the output node 134 and a second terminal coupled, preferably connected, to the ground node Gnd.

The bandgap core circuit 114 includes a differential operational transconductance amplifier (OTA) circuit 116 configured in a current control feedback loop that generates an output current Iout which controls generation of the mirrored currents by the transistors QA, QB and QC. The non-inverting (+) input of the differential OTA circuit 116 receives a voltage V+ at the collector of the transistor QA and the inverting (−) input of the differential OTA circuit 116 receives a voltage V− at the collector of the transistor QB. The bandgap core circuit 114 further includes PNP bipolar transistors Q1 and Q2. The collector terminals of transistors Q1 and Q2 are coupled, preferably connected, to a virtual ground node 150. The base terminals of transistors Q1 and Q2 are coupled, preferably connected, to each other and to the virtual ground node 150. The transistors Q1 and Q2 of the bandgap core circuit 114 are thus each connected in diode-configuration. The emitter terminal of transistor Q1 is coupled, preferably connected, to an intermediate node 118. The emitter terminal of transistor Q2 is coupled, preferably connected, to the collector of transistor QB at the inverting (−) input of the differential OTA circuit 116. A resistor R1 has a first terminal coupled, preferably connected, to the intermediate node 18 and a second terminal coupled, preferably connected, to the collector of transistor QA at the non-inverting (+) input of the differential OTA circuit 116. A first resistor R2 has a first terminal coupled, preferably connected, to the collector of transistor QA at the non-inverting (+) input of the differential OTA circuit 116 and a second terminal coupled, preferably connected, to the virtual ground node 150. A second resistor R2 has a first terminal coupled, preferably connected, to the emitter of transistor Q2 at the inverting (−) input of the differential OTA circuit 116 and a second terminal coupled, preferably connected, to the virtual ground node 150.

A resistor Rshift has a first terminal coupled, preferably connected, to the virtual ground node 150 and a second terminal coupled, preferably connected, to a circuit ground node Gnd. It will be noted that in an alternative implementation, the resistor Rshift may be omitted and the virtual ground node 150 and ground node Gnd would then be the same node. This alternative implementation is indicated in FIG. 2A by the dotted double-arrow connection 152.

The differential OTA circuit 116 includes a differential pair 120 of input transistors Q5, Q6 coupled to a current mirror load circuit 122 formed by transistors Q7, Q8. The input transistors Q5, Q6 are NPN bipolar transistors. The load transistors Q7, Q8 are PNP bipolar transistors. The common emitter terminals of the transistors Q5 and Q6 are coupled, preferably connected, to a tail current source 124 connected to the ground node Gnd. The base terminal of input transistor Q5 (at the non-inverting (+) input) receives the voltage V+ at collector of the transistor QA (as well as a base current Ib) and the base terminal of the input transistor Q6 (at the inverting (−) input) receives the voltage V− at collector of the transistor QB (as well as a base current Ib). The collector terminal of input transistor Q5 is coupled, preferably connected to the collector and base terminals of the load transistor Q7. The collector terminal of input transistor Q6 is coupled, preferably connected to the collector terminal of the load transistor Q8 at the output of the amplifier. The base terminals of the transistors Q7, Q8 are coupled, preferably connected, to each other. The transistor Q7 is connected in diode-configuration. The output current Iout of the differential OTA circuit 116 generated at the common collector terminals of transistors Q6 and Q8 is a function of the difference between the voltages V+ and V−. A stabilization capacitor Cs has a first terminal coupled, preferably connected, to the common collector terminals of transistors Q6 and Q8 and a second terminal coupled, preferably connected, to the ground node Gnd.

Figure 1A:
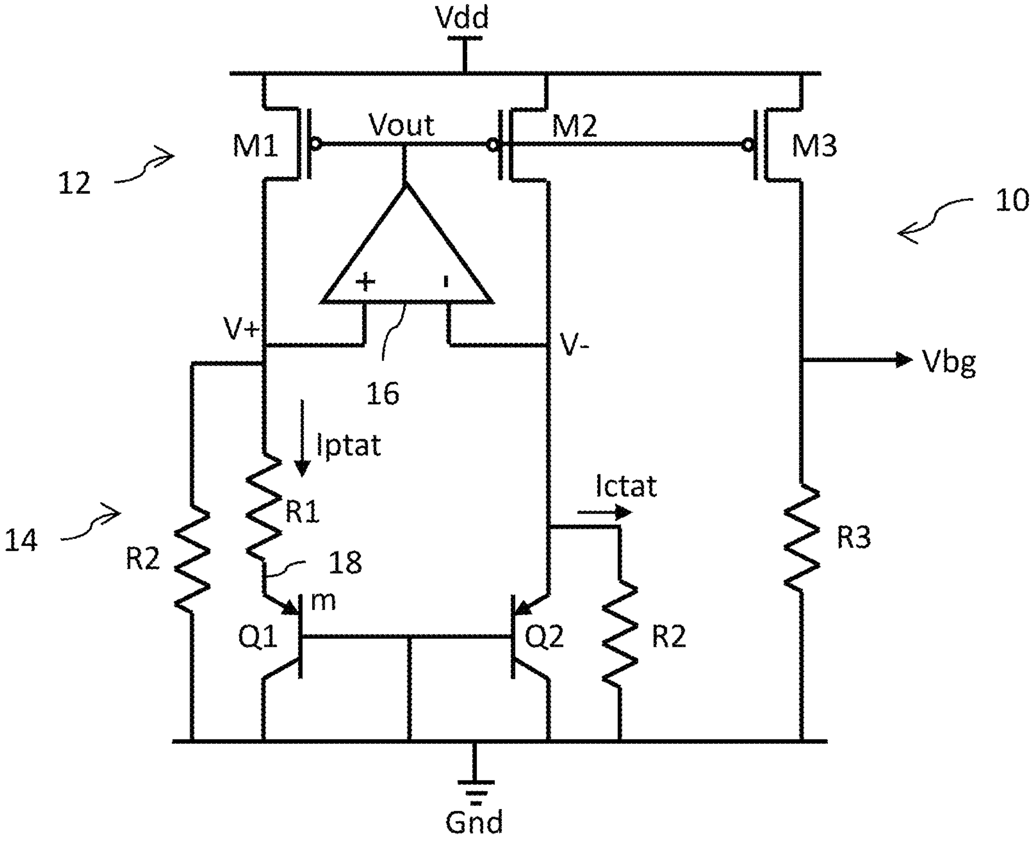
FIG. 1A (Prior Art)
FIGS. 1A and 1B show a circuit diagram for a conventional current-mode bandgap reference voltage generator circuit.
Figure 1B:
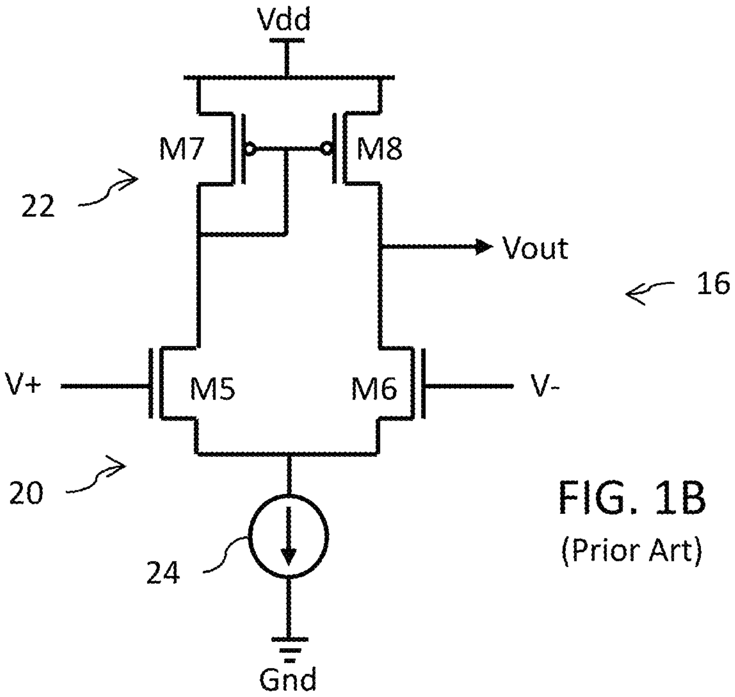
FIG. 1B (Prior Art)

The use of an OTA amplifier 116 formed by bipolar transistor devices, as opposed to the differential amplifier 16 formed by MOSFET devices in FIG. 1B, assists in with addressing the flicker (1/f) noise concern. Flicker noise is also addressed by using bipolar transistors QA, QB and QC in the current mirroring circuit 112, as opposed to MOSFET devices M1, M2 and M3 in FIG. 1A. The main drawback of using bipolar transistors for the differential pair 120 of input transistors Q5, Q6 is their base current Ib. It will be noted that the mirrored current flowing through each of the transistors QA, QB and QC has three components: the PTAT current Iptat across R1, the CTAT current Ictat across R2, and the base current Ib flowing into the bases of the pair of transistors 120. The base current Ib is unwanted and must be addressed by compensation. The effect of this base current Ib is compensated at the output node 134 where the reference voltage Vbg is generated. The compensation current sink circuit 115 operates to sink a compensation current Ib' from the third current flowing through transistor QC, wherein the compensation current Ib' corresponds to (i.e., is equal or substantially equal within the limits of circuit tolerances to) the base current Ib.

The current sink circuit 115 replicates one-half of the differential OTA circuit 116 with a bipolar PNP transistor QD (matching the transistor Q7), an NPN transistor QE (matching the transistor Q5), and a current source 140 (corresponding to the tail current source 124 but with a different current magnitude). The emitter terminal of transistor QD is coupled, preferably connected, to the supply node Vdd. The collector and base terminals of transistor QD are coupled, preferably connected, to each other at intermediate node 142. The transistor QD is connected in diode-configuration. The collector terminal of transistor QE is coupled, preferably connected, to intermediate node 142. The base terminal of transistor QE is coupled, preferably connected, to the output node 134 and is biased by the compensation current Ib' corresponding to the base current Ib at the pair of transistors 120 in amplifier 116. The emitter terminal of transistor QE is coupled, preferably connected, to current source 140 connected to the ground node Gnd. Because the current sink circuit 115 replicates only one-half of the differential OTA circuit 116, the current source 140 sinks a current Is with a magnitude that is one-half the magnitude of the current 2Is sunk by the current source 124.

Since the amplifier 116 is of the OTA-type, it cannot effectively drive a resistive load (i.e., it cannot sink with current Iout a current with a magnitude of 3Ib from the connected bases of the transistors QA, QB and QC) without introducing a significant offset to the amplifier input. To address this issue, the bandgap core circuit 114 further includes a current buffer circuit 130. The output current Iout is buffered by the current buffer circuit 130 to generate the bias current Ibias. The magnitude of the first, second and third mirrored currents at the collectors of transistors QA, QB and QC is a function of the bias current Ibias.

The current buffer circuit 130 comprises a first follower circuit formed by a first transistor T1 having a control terminal coupled, preferably connected, to receive the amplifier output current Iout, a reference terminal coupled, preferably connected, to the ground node Gnd and a follower terminal coupled, preferably connected to receive a first source current Isrc generated by a first current source 151 coupled to the supply node Vdd. The current buffer circuit 130 further comprises a second follower circuit formed by a second transistor T2 having a control terminal coupled, preferably connected, to the follower terminal of the transistor T1, a reference terminal coupled, preferably connected, to the supply node Vdd and a follower terminal coupled, preferably connected to receive a sink current Isnk generated by a second current source 153 coupled to the ground node Gnd. The bias current Ibias is generated at the follower terminal of the transistor T2.

In a preferred implementation as shown in FIG. 2B, the current buffer circuit 130 is implemented as a source-follower circuit where the first transistor T1 is a p-channel MOSFET device and the second transistor T2 is an n-channel MOSFET device. The drain of transistor T1 is connected to ground and the source of transistor T1 is connected to the first current source 151 and to the gate of transistor T2. The drain of transistor T2 is connected to the supply node Vdd and the source of transistor T2 is connected to the second current source 153 and provides the current Ibias. The implementation illustrated using MOSFET devices for transistors T1, T2 is preferred because there is no current consumption at the gate terminals. It will be noted that any flicker noise introduced by the use of MOSFET devices for transistors T1, T2 is considered to insignificantly contribute to overall noise in the output voltage Vbg and can be ignored.

The use of first and second follower circuits in the current buffer circuit 130 makes it possible to maintain approximately the same voltage at the collector terminals of transistors Q7, Q8 in order to guarantee the linear operation of transistor Q8 in generating the current Iout and thus avoid any early differential effect.

In the implementation which uses the resistor Rshift, the resistance of the resistor Rshift is selected as a function of the mirrored first and second currents (in transistors QA and QB) and the base current Ib so that the voltage drop across the resistor is equal or substantially equal (within design tolerances) to the voltage drop across the current source 124 in the amplifier 116.

While the invention has been illustrated and described in detail in the drawings and foregoing description, such illustration and description are considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

What is claimed is:

1. A circuit, comprising:

a bandgap voltage generator circuit, wherein the bandgap voltage generator circuit includes a current mirror circuit coupled to an output node at which a bandgap reference voltage is generated and a transconductance amplifier circuit in a current control feedback loop having a differential input which receives a base current;

wherein transistors used in the current mirror circuit and at the differential input of the transconductance amplifier circuit are only bipolar transistors; and a compensation current sink circuit configured to sink a compensation current from the output node corresponding to the base current of the bipolar transistors at the differential input of the transconductance amplifier.

2. The circuit of claim 1:

wherein the transconductance amplifier circuit comprises a first bipolar transistor in diode connected configuration coupled to a second bipolar transistor with a base terminal receiving the base current; and wherein the compensation current sink circuit comprises a third bipolar transistor in diode connected configuration coupled to a fourth bipolar transistor with a collector connected to the third bipolar transistor and a base terminal receiving the compensation current.

3. The circuit of claim 2, wherein the first and third bipolar transistors are matching transistors.

4. The circuit of claim 2, wherein the second and fourth bipolar transistors are matching transistors.

5. The circuit of claim 2:

wherein the transconductance amplifier circuit further comprises a tail current source coupled to the second bipolar transistor; and wherein the current sink circuit further comprises a further current source coupled to the fourth bipolar transistor;

wherein a current magnitude of the tail current source is two times a current magnitude of the further current source.

6. The circuit of claim 5, further comprising:

wherein the bandgap voltage generator circuit is coupled to a virtual ground;

a shift resistor coupled between the virtual ground and a circuit ground; and wherein a voltage drop across the shift resistor is equal or substantially equal to a voltage drop across the tail current source.

7. The circuit of claim 1, further comprising a current buffer circuit configured to buffer an output current of the transconductance amplifier circuit to generate a bias current for the current control feedback loop.

8. The circuit of claim 7, wherein the current buffer circuit comprises:

a first follower circuit having an input coupled to receive the output current of the transconductance amplifier circuit; and a second follower circuit having an input coupled to receive an output of the first follower circuit and an output configured to generate the bias current.

9. The circuit of claim 8, wherein the first follower circuit comprises a first follower transistor coupled to a first current source at the output of the first follower circuit, wherein a control terminal of the first follower transistor is configured to receive the output current of the transconductance amplifier circuit, and wherein the second follower circuit comprises a second follower transistor coupled to a second current source at the output second follower circuit, wherein a control terminal of the second follower transistor is coupled to the output of the first follower circuit.

10. The circuit of claim 9, wherein the first current source is configured to source current to the first follower transistor and wherein the second current source is configured to sink current from the second follower transistor.

11. A circuit, comprising:

a current mirroring circuit including a first bipolar transistor, a second bipolar transistor and a third bipolar transistor, wherein an output voltage is generated at an output node in response to a third mirrored current output by the third bipolar transistor;

a bandgap core circuit including:

a fourth bipolar transistor and a fifth bipolar transistor coupled, respectively, to the first and second bipolar transistors and configured to use a difference in base to emitter voltages of the fourth and fifth bipolar transistors to generate a complementary to absolute temperature (CTAT) voltage and a proportional to absolute temperature (PTAT) voltage from first and second mirrored currents output by the first and second bipolar transistors, respectively; and a transconductance amplification circuit having a differential input coupled, respectively, to the first and second bipolar transistors to receive a base current, and an output coupled to apply a bias current to base terminals of the first, second and third bipolar transistors;

wherein the transconductance amplification circuit comprises a sixth bipolar transistor in diode connected configuration coupled to a seventh bipolar transistor with a base terminal at the differential input receiving the base current; and a current sink circuit configured to sink a compensation current from the output node corresponding to the base current at the base terminal of the seventh bipolar transistor of the transconductance amplification circuit.

12. The circuit of claim 11, wherein the current sink circuit comprises an eighth bipolar transistor in diode connected configuration coupled to a ninth bipolar transistor with a collector connected to the eighth bipolar transistor and a base terminal receiving the compensation current.

13. The circuit of claim 12, wherein the sixth and eighth bipolar transistors are matching transistors.

14. The circuit of claim 12, wherein the seventh and ninth bipolar transistors are matching transistors.

15. The circuit of claim 12:

wherein the transconductance amplification circuit further comprises a tail current source coupled to the seventh bipolar transistor; and wherein the current sink circuit further comprises a further current source coupled to the ninth bipolar transistor;

wherein a current magnitude of the tail current source is two times a current magnitude of the further current source.

16. The voltage generator circuit of claim 15, further comprising:

wherein the fourth and fifth bipolar transistors are coupled to a virtual ground;

a shift resistor coupled between the virtual ground and a circuit ground; and where a voltage drop across the shift resistor is equal or substantially equal to a voltage drop across the tail current source.

17. The voltage generator circuit of claim 11, wherein the transconductance amplification circuit comprises a transconductance amplifier and a current buffer, wherein the current buffer is configured to buffer an output current of the transconductance amplifier to generate the bias current applied to base terminals of the first, second and third bipolar transistors.

18. The circuit of claim 17, wherein the current buffer comprises:

a first follower circuit having an input coupled to receive the output current of the transconductance amplifier; and a second follower circuit having an input coupled to receive an output of the first follower circuit and an output configured to generate the bias current.

19. The circuit of claim 18, wherein the first follower circuit comprises a first follower transistor coupled to a first current source at the output first follower circuit, wherein a control terminal of the first follower transistor is configured to receive the output current of the transconductance amplifier, and wherein the second follower circuit comprises a second follower transistor coupled to a second current source at the output second follower circuit, wherein a control terminal of the second follower transistor is coupled to the output of the first follower circuit.

20. The voltage generator circuit of claim 19, wherein the first current source is configured to source current to the first follower transistor and wherein the second current source is configured to sink current from the second follower transistor.

* * * * *